United States Patent [19]

Playe

[11] Patent Number: 4,689,643

[45] Date of Patent: Aug. 25, 1987

[54] ELECTROSTATIC PRINT HEAD

[75] Inventor: Patrice Playe, Houilles, France

[73] Assignee: La Telephonie Industrielle et Commerciale Telic Alcatel, France

[21] Appl. No.: 923,923

[22] Filed: Oct. 28, 1986

[30] Foreign Application Priority Data

Oct. 28, 1985 [FR] France ............................ 85 15979

[51] Int. Cl.[4] ........................................ G01D 15/06

[52] U.S. Cl. ................................ 346/155; 346/139 C

[58] Field of Search ........... 346/154, 155, 162, 139 C, 346/76 PH; 101/DIG. 13; 400/119; 358/295, 300

[56] References Cited

U.S. PATENT DOCUMENTS

| | | | |
|---|---|---|---|
| 3,348,232 | 10/1967 | King | 346/155 |
| 4,443,292 | 4/1984 | Lakhani et al. | 346/155 |
| 4,534,814 | 8/1985 | Volpe et al. | 346/155 |

FOREIGN PATENT DOCUMENTS

| | | | |
|---|---|---|---|
| 999620 | 7/1965 | United Kingdom | 346/155 |

OTHER PUBLICATIONS

"Fabrication Process for Print Electrode Arrays", by Acciai et al., IBM Tec. Dis. Bulletin, vol. 27, No. 6, Nov. 1984, pp. 3421–3422.

*Primary Examiner*—Arthur G. Evans
*Attorney, Agent, or Firm*—Sughrue, Mion, Zinn, Macpeak, and Seas

[57] ABSTRACT

The invention relates to electrostatic print heads enabling an electrostatic latent image to be progressively built up on a moving medium (18) which may be constituted by special paper or by some other material, by discharging ions using a set of aligned electrodes (20) and a counterelectrode (1) disposed opposite said electrodes on the other side of the moving medium (18). The counterelectrode (1) is constituted by a cylindrical or semi-cylindrical resistive layer (7) covering connection conductors ($C_1$ to $C_{n+1}$) which are constituted by parallel rings or ring sectors sharing a common axis with the resistive layer and having cylindrical or semi-cylindrical resistive portions extending therebetween. The rings or ring sectors are individually connected to outlets from an electronic selective switching circuit (CEC) which is at least partially housed within the concave portion of said counterelectrode (1).

5 Claims, 4 Drawing Figures

ELECTROSTATIC PRINT HEAD

The present invention relates to print devices using a plurality of individual electrodes aligned over at least one row for printing on a recording medium which is moved past the electrodes.

BACKGROUND OF THE INVENTION

The invention relates more particularly to an electrostatic print head by means of which an electrostatic latent image is progressively built up on the recording medium by ion discharge obtained by raising the electrodes to high tension as the recording medium is moved past the head.

If good resolution is required, the print head must have a very large number of very small electrodes, for example when printing at eight points per millimeter on a recording medium in A4 format (21 cm or 8.2" wide) then 1728 printing electrodes are required.

In practical implementations, the electrodes are associated with counterelectrodes raised to a high tension of opposite polarity in order to avoid applying the full high tension required for setting up the ion discharge necessary for printing an electrostatic image solely to the said electrodes. Under such conditions, the high tension necessary for obtaining ion discharge is applied across a corresponding electrode/ counterelectrode pair with the absolute value of the high tension applied solely to the electrode or solely to the counterelectrode being less than a threshold value for said ion discharge, and thus being incapable of giving rise to printing.

When performing indirect electrostatic printing, an intermediate recording medium such as a thin insulating film stored in roll form is used to receive the electrostatic latent image, and the latent image is then developed, for example by using a magnetic brush to transfer particles of ink thereto. The developed electrostatic image is then transferred from the intermediate medium to a final medium (generally paper in the form of separate or separable sheets) for example by direct contact between the intermediate medium and the final medium while applying high pressure.

When performing direct electrostatic printing, the intermediate medium is omitted, but the final medium must be constituted by a conductive base which is coated with a thin dielectric deposit enabling the latent image to be formed thereon, enabling the image to be developed by means of ink powder, and then enabling the developed image to be fixed, all on the same medium.

Published european patent specification No. 0 124 856 describes an electrostatic print head comoprising firstly at least one row of individual electrodes disposed at regular pitch and organized in n groups, with said groups being themselves organized in successive sets of at least two groups per set, and with electrodes occupying the same position within a group and the same group within a set being interconnected. The above-mentioned electrostatic print head further comprises a counterelectrode facing said electrodes over not less the length of the row under consideration and constituted by a resistive material which is in contact with n+1 conductors disposed at regular intervals at substantially the same pitch as the groups of electrodes within the row. The n+1 conductors define therebetween n resistive portions having substantially identical resistances and connected in series, with each of said resistive portions being disposed opposite a corresponding one of the groups of electrodes and being attributed to selecting said group from the other groups.

In the embodiment shown in said European patent specification, a very large number of connections need to be provided both for the electrodes and for the counterelectrodes since there are 73 counterelectrodes, for example, for a particular print head embodiment which includes 1728 points.

The present invention thus proposes firstly an arrangement of counterelectrodes enabling a portion of the counterelectrode control electronics to be incorporated in the counterelectrode itself so as to reduce the number of connections.

In addition, the movement of the, or each, print medium between the electrodes and the counterelectrodes wears down said electrodes and/or counterelectrodes and uselessly brakes the movement of the medium.

The present invention thus also proposes a counterelectrode arrangement of the kind mentioned above which seeks to reduce braking on the medium and wear on the counterelectrodes.

SUMMARY OF THE INVENTION

The present invention provides an electrostatic print head comprising firstly at least one row of individual electrodes disposed at a regular pitch and organized in n groups, said groups themselves being organized in successive sets each comprising at least two groups, with electrodes having the same positions within the groups and belonging to groups having the same positions within the sets being interconnected, the electrostatic print head comprising secondly a counterelectrode facing the electrodes over at least the length of the row in question, said counterelectrode being constituted by a resistive material having n+1 connection conductors in contact therewith and disposed at regular intervals substantially equal to the pitch of the groups of electrodes along said row, said connection conductors defining n resistive portions therebetween, with each of said n resistive portions being disposed opposite a corresponding group of electrodes and being attributed to said corresponding group for selecting said group from the other groups, said resistive portions forming n electrical resistances which are substantially identical and which are connected in series, the electrostatic print head including the improvement whereby the counterelectrode is constituted by an outer cylindrical or semi-cylindrical resistive layer covering the n+1 connection conductors which are constituted by parallel rings or ring sectors sharing a common axis with the resistive layer and which are individually connected to the outputs of an electronic circuit for selectively switching voltages, which circuit is at least partially placed within the concave portion of said counterelectrode.

Advantageously, the counterelectrode is in the form of a circular cylinder and is rotatably mounted about an axis perpendicular to the direction of displacement of the recording medium which is inserted pressed against the counterelectrode between the individual electrodes and the counterelectrode.

BRIEF DESCRIPTION OF THE DRAWINGS

An embodiment of the invention is described by way of example with reference to the accompanying drawings, in which.

MORE DETAILED DESCRIPTION

Figure 1:
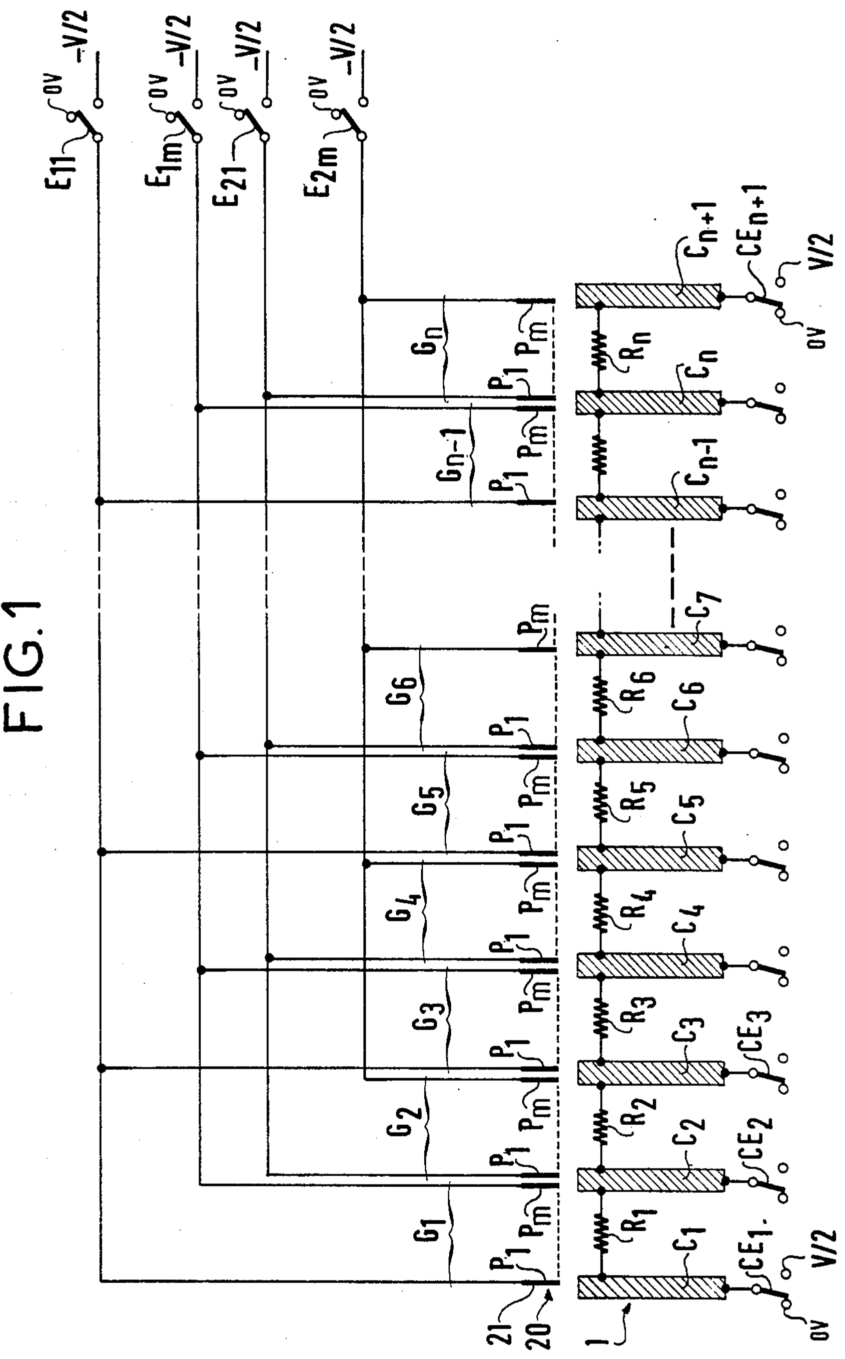
FIG. 1 is the equivalent electric circuit of an electrostatic print head.

FIG. 1 shows the equivalent electric circuit of an electrostatic print head as provided in the above-specified European patent specification, said print head comprising a counterelectrode 1 associated with a set of electrodes 2 which includes at least one row 20 of electrodes.

In the row 20, the individual electrodes 21 are disposed at a regular pitch and are organized in two networks of n identical groups which are referenced $G_1$ to $G_n$ with the successive positions of the electrodes within each group being referenced $P_1$ to $P_m$. The electrodes occupying the same positions within the odd-numbered groups, i.e. the groups $G_1$, $G_3$ . . . are interconnected. Likewise the electrodes occupying the same positions within the even-numbered groups $G_2$, $G_4$, . . . are also interconnected. These electrodes in positions $P_1$ and $P_m$ are connected to a potential $-V$ or 0 volts via a first set of m individual switches $E_{11}$ to $E_{1m}$ for the oddnumbered groups and via a second set of m individual switches $E_{21}$ to $E_{2m}$ for the even-numbered groups, with the first and second sets of switches being independent from each other.

The counterelectrode 1 is made of resistive material and comprises n+1 connection conductors C referenced $C_1$ to $C_{n+1}$, with portion extending between successive connection conductors with one of the different groups of electrodes opposite which the counterelectrode is placed.

On this resistive counterelectrode 1, the n+1 connection conductors define a set of n series-connected resistors $R_1$ to $R_n$, each of which is individually attributed to a corresponding group of electrodes $G_1$ to $G_n$ and each of which is disposed opposite the corresponding group. The connection conductors $C_1$ to $C_{n+1}$ are connected to a potential of V/2 or 1 volts by means of n+1 individual switches $CE_1$ to $CE_{n+1}$, where V is the high tension voltage required to obtain printing.

Figure 2:
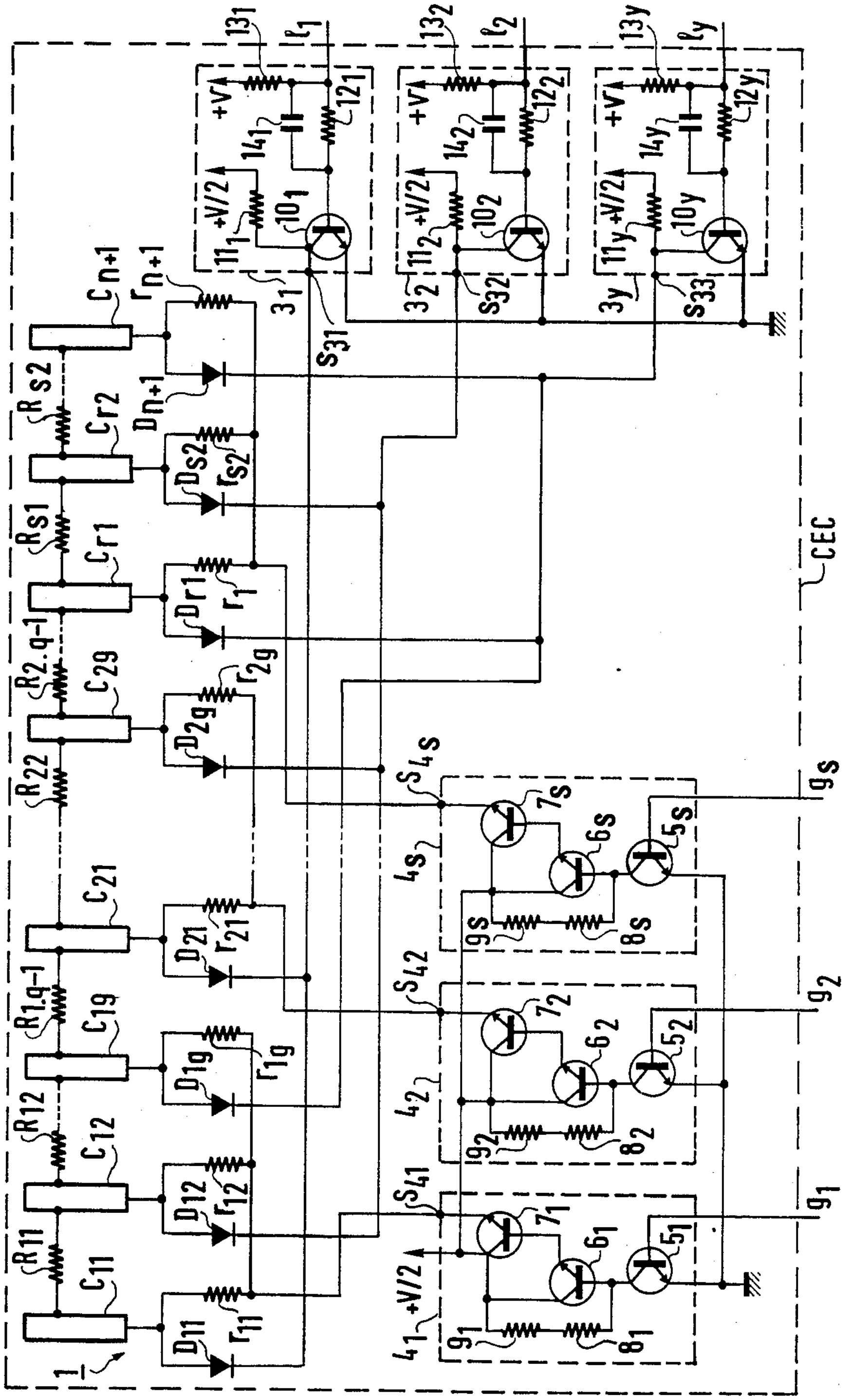
FIG. 2 shows an example of an electronic voltage-selecting switching circuit for a counterelectrode of an electrostatic print head.

FIG. 2 shows an example of the electronic switching circuit for selecting the voltages to be applied to the resistive counterelectrode 1, but this example must not be taken to be limiting since other known circuits, for example circuits based on shift registers having high tension outputs, could also be used.

In the example shown, the n resistances R are grouped into s groups each of which contains not more than q-1 successive resistances R on the counterelectrode 1, for example the group of resistances $R_{11}$, $R_{12}$,...$R_{1.q-1}$.

Two-dimensional matrix type controls can be used to apply voltage to each of the n+1 connection conductors C to the n resistances R.

Each connection conductor is connected firstly via a diode D to a first switching arrangement, in this case referred to as a line switching arrangement 3, such as the connection conductor $C_{11}$ connected to the line switching arrangement $\mathbf{3}_1$ via the diode $D_1$, and secondly via a resistor r to a "group" switching arrangement 4, for example the resistor $r_{11}$ connecting the connection conductor $C_{11}$ to the group switching arrangement $\mathbf{4}_1$.

The switching arrangements 3 and 4 apply alternating potentials of +V/2 and 1 volts are required by printing needs to the connection conductors to which they are connected either via the diodes D or else via the resistors r.

In the embodiment shown, the connection conductors C to the successive resistances R belonging to the same group are served by the same group switching arrangement 4 whose output S is connected to the corresponding connection conductors via respective resistors r, for example the connection conductors $C_{11}$ to $C_{19}$ are respectively connected via resistors $r_{11}$ to $r_{19}$ to the output $S_{41}$ of the group switching arrangement $\mathbf{4}_1$.

The group switching arrangements $\mathbf{4}_1$, $\mathbf{4}_2$, $\mathbf{4}_9$ shown here by way of example each comprise a first NPN type switching transistor 5 whose base receives an external control signal as a function of printing needs via a wire g for example the wire $g_1$ for transistor $\mathbf{5}_1$, in order to alternately connect its output S to ground potential or to a potential of +V/2.

The output S of the switching arrangement is connected to one or other of these two potentials via a Darlington type circuit comprising two NPN type transistors 6 and 7 and two resistors 8 and 9, with the emitter of each transistor 7 being connected to the corresponding output S, for example with the emitter of transistor $7_1$ being connected to output $S_{41}$, and the collector of each transistor 7 being connected to the potential +V/2, while the collector of each transistor 6 corresponds to one of the terminals of the corresponding resistor 9. The base of each transistor 6 is connected to the collector of the switching transistor 5 of the switching arrangement to which it belongs so as to be connected to ground potential by the emitter of the switching transistor 5 when said transistor is conductive. The base of each transistor 7 is controlled by the emitter of the corresponding transistor 6.

The connection conductors C of the successive resistances R within the same group are served by different line switching arrangements 3, such as the arrangements $\mathbf{3}_1$, $\mathbf{3}_2$, . . . $\mathbf{3}_y$, with each connection conductor C being connected to the line switching arrangement 3 which serves it via an individual diode D, such as the connection conductor $T_1$ being connected via the diode $D_{11}$ to the line switching arrangement $\mathbf{3}_1$.

Each line switching arrangement 3 is conventionally connected ia its output $S_3$ to the cathodes of diodes B of the various connection conductors C taken from different groups, for example the output $S_{31}$ from the line switching arrangement $\mathbf{3}_1$ is connected to the diode $D_{11}$, $D_{21}$, . . . $D_{r1}$ of the conductors $C_{11}$, $C_{21}$, . . . $C_{r1}$ in position 1 in the groups 1, 2, . . . r, of resistances R.

Each line switching arrangement output $S_3$ is also capable of being connected to ground potential or to a potential of +V/2 by means of a simplified circuit comprising an NPN type switching transistor 10 whose emitter is connected to ground, whose collector is connected to the potential +V/2 via a resistor 11, and whose base receives an external control signal as a function of print need via a resistor 12 and a wire 1, for example the base of transistor $\mathbf{10}_y$ is connected via resistor $\mathbf{12}_y$ to wire $\mathbf{1}_y$.

Each line switching arrangement 1*a* also includes a resistor 13 connected to a small positive potential +v and includes a capacitor 14 connected in parallel with its resistor 12.

The two switching arrangements which are connected to a single connection conductor C, for example a line switching arrangement $3_1$ and a group switching arrangement $4_1$ which are both connected to the conductor $C_{11}$, are simultaneously connected to the potential $+V/2$ in order to raise the connection conductor to said potential, and in any other configuration the connection conductor remains connected to ground potential.

In a preferred variant, the connection conductors C are powered sequentially in pairs.

Figure 3:
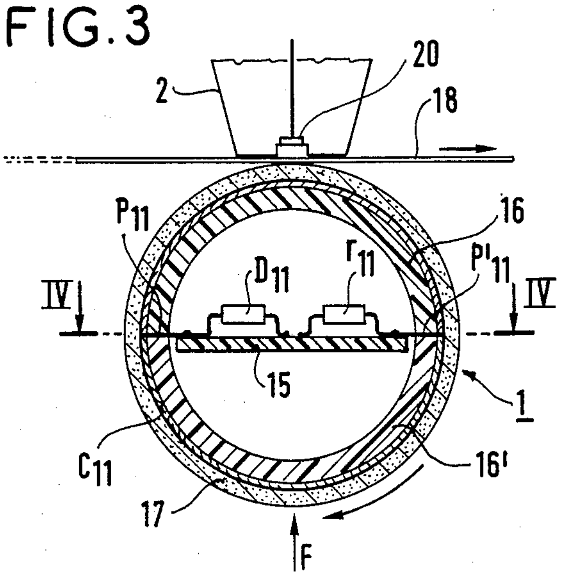
FIGS. 3 and 4 show an example of a counterelectrode in accordance with the invention by means of a cross-section and a longitudinal section respectively.
Figure 4:
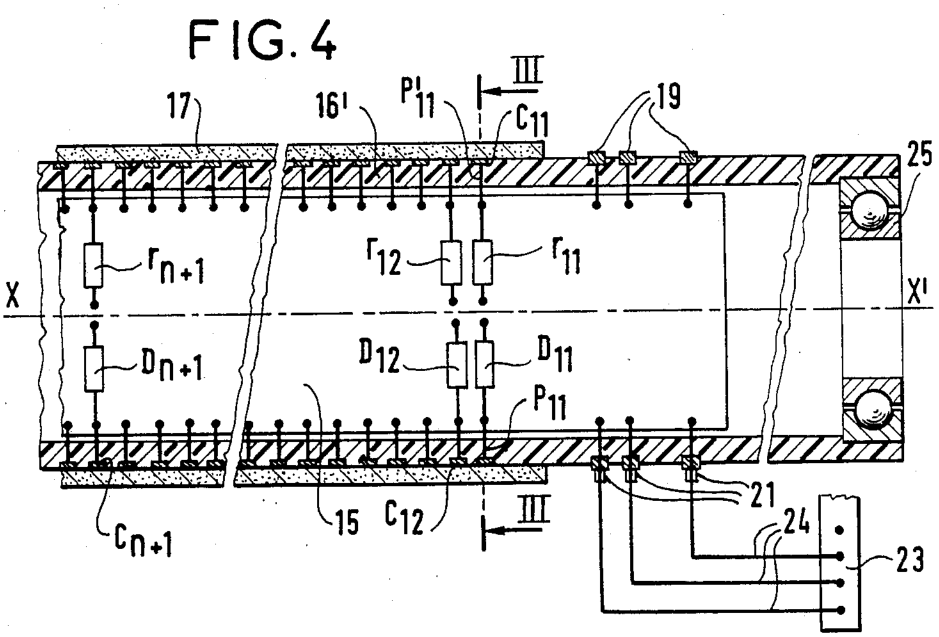

The electronic switching circuit for selecting voltages are defined above with reference to FIG. 2 is conventionally provided on a physical support such as a printed circuit card which bears the reference 15 in FIGS. 3 and 4.

In a preferred implementation of the invention, this circuit is closely associated with the counterelectrode 1 which it serves, said counterelectrode being cylindrical or possibly semi-cylindrical in shape and said printed circuit card 15 being received in the bore thereof.

FIG. 3 shows a cylindrical counterelectrode 1 which is intended to be rotatably mounted, and a semi-cylindrical counterelectrode could have been used instead if the counterelectrode were to be fixed.

The circular section counterelectrode shown in FIG. 3 and 4 comprises annular connection conductors C connected, for example, by pins P which provide electrical connections to the tracks of the printed circuit card 15 on which the resistors r and the diodes D are fitted, for example the connection conductor $C_{11}$ is connected via pins $P_{11}$ and $P'_{11}$ both to the diode $D_{11}$ and to the resistor $r_{11}$.

In one embodiment, the printed circuit card 15 is disposed on a longitudinal mid-plane of the circular cylinder counterelectrode between two semi-cylindrical shells 16 and 161 made of insulating material and fitted to each other in order to provide a physical framework for said counterelectrode.

The rings or ring sectors formed by the connection conductors C are placed, for example, in external circular grooves of the assembly constituted by the two assembled half-shells.

The pins P extend to the outside surface of the half-shells 16 and 16' for connection to the rings or to the ring sectors and they are connected thereto by welding or soldelring, for example.

The pins P are disposed in the same plane as the rings which they serve and they pass through the assembly constituted by the assembled half-shells via notches (not shown) provided in the join plane between the half-shells.

In the embodiment shown, the resistor r and the diode D associated with a ring-shaped connection conductor C are disposed level with said ring of the counterelectrode, and more precisely on the printed circuit card 15, the pins P and P' serving said resistor and said diode are disposed symmetrically about the counterelectrode axis and in the plane of said ring.

The interconnected half-shells 16 and 16' bearing the rings formed by the connection conductors C are covered together with the rings by a layer 17 of thin flexible resistive material whose resistivity is, for example, about $10^7$ to $10^8$ ohm.centimeters. The resistances R between the connection conductors are constituted by the zones of said layer 17 lying between the rings.

The counterelectrode 1 constituted in this way is intended to co-operate with a set 2 of electrodes 20 which can be seen end-on in FIG. 3, with the electrodes being disposed in at least one row and preferably in two rows extending parallel to generator lines of the cylinder formed by the counterelectrode 1 so as to enable an intermediate medium to pass between the electrode 2 and the counterelectrode 1.

If the counterelectrode 1 is not rotatably mounted, it could naturally be semi-cylindrical in shape, with the printed circuit card 15 remaining on the inside thereof for reasons of convenience.

If the counterelectrode is rotatably mounted, and for example if it is mounted free to rotate about its axis XX' (see FIG. 4), it is necessary for the electronic voltage switching circuit on the printed circuit card to be fed with appropriate voltages. This may be performed conventionally by means of a conventional arrangement of a slip ring 19 fixed to the rotating part, i.e. to the counterelectrode 1, and rubbing brushes 21 fixed to a fixed connector 23 which are in turn connected to various control wires 23 of an electronic voltage-switching circuit.

Preferably, as indicated above, the counterelectrode 1 is mounted in bearings or ball bearings 25 (only one shown in the figure) so as to be rotated by the intermediate medium 18 rubbing thereagainst.

I claim:

1. An electrostatic print head comprising firstly at least one row of individual electrodes disposed at a regular pitch and organized in n groups, said groups themselves being organized in successive sets each comprising at least two groups, with electrodes having the same positions within the groups and belonging to groups having the same positions within the sets being interconnected, the electrostatic print head comprising secondly a counterelectrode facing the electrodes over at least the length of the row in question, said counterelectrode being constituted by a resistive material having n+1 connection conductors in contact therewith and disposed at regular intervals substantially equal to the pitch of the groups of electrodes along said row, said connection conductors defining n resistive portions therebetween, with each of said n resistive portions being disposed opposite a corresponding group of electrodes and being attributed to said corresponding group for selecting said group from the other groups, said resistive portions forming n electrical resistances which are substantially identical and which are connected in series, the electrostatic print head including the improvement whereby the counterelectrode is constituted by an outer cylindrical or semi-cylindrical resistive layer covering the n+1 connection conductors which are constituted by parallel rings or ring sectors sharing a common axis with the resistive layer and which are individually connected to the outputs of an electronic circuit for selectively switching voltages, which circuit is at least partially placed within the concave portion of said counterelectrode.

2. An electrostatic print head according to claim 1, wherein each ring conductor or ring sector conductor is symmetrically connected to the electronic circuit for switching voltages via two connections situated level with the side edges of the support on which said electronic voltage switching circuit is constituted.

3. An electrostatic print head according to claim 2, wherein one of the two connections to a ring conductor or a ring sector conductor is connected via a resistor to a group selection switch suitable for applying one or other of two voltages thereto depending on the control state of the switch, and wherein the other connection to the same conductor is connected via a diode to a line selection switch suitable for applying one or other of said voltages thereto depending on the control state thereof.

4. An electrostatic print head according to claim 1, wherein the counterelectrode is in the form of a circular cylinder and is rotatably mounted about an axis perpendicular to the direction of displacement of the recording medium which is inserted pressed against the counterelectrode between the individual electrodes and the counterelectrode.

5. An electrostatic print head according to claim 1, wherein the support for the electronic voltage-selecting switching circuit is fixed betwee two semi-cylindrical shells via diametricallyopposite joints through which electrical connection pins pass for making electrical connection with the ring conductors, and with a circularly cylindrical resistive layer surrounding the assembly constituted by the circuit support and the assembled half-shell which enclose said circuit support.

* * * * *